Nov. 12, 1935.  L. C. STONE  2,020,384
CAMERA CONSTRUCTION
Filed Oct. 11, 1934
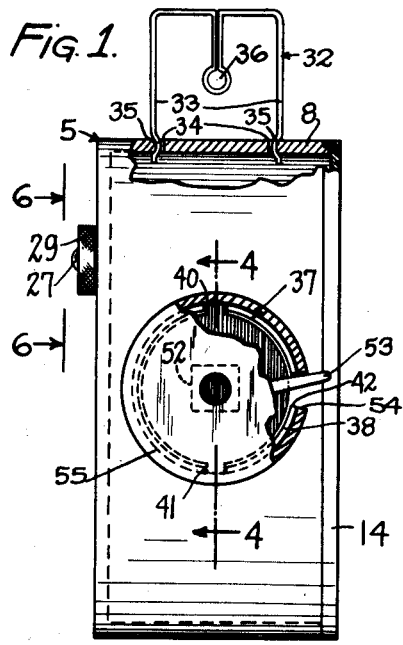
Fig. 1.
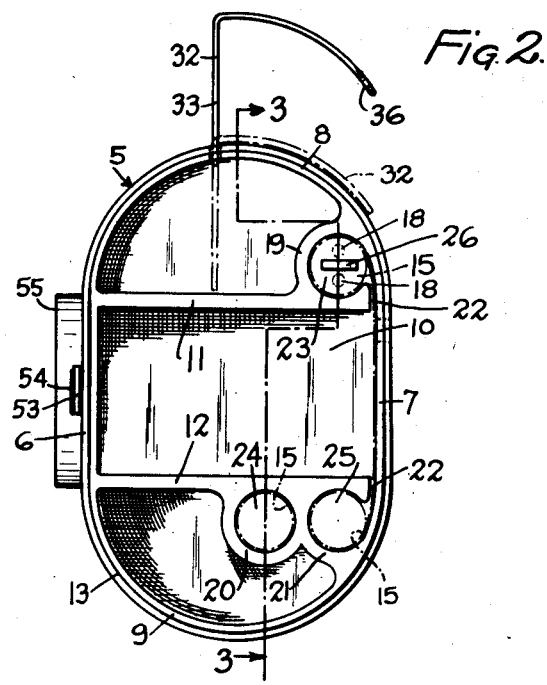
Fig. 2.
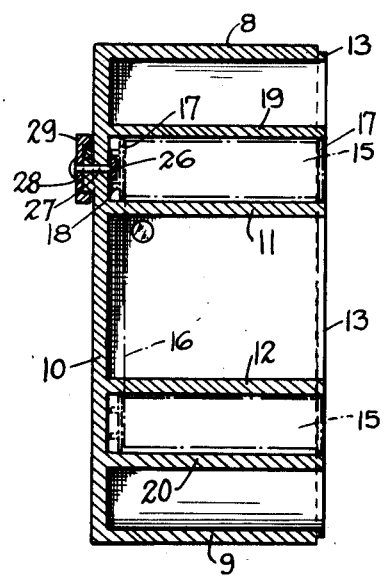
Fig. 3.
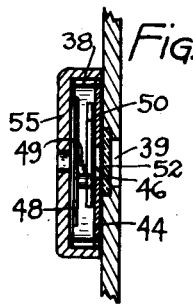
Fig. 4.
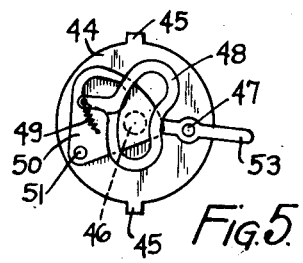
Fig. 5.
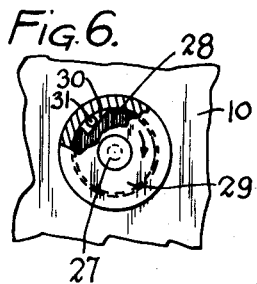
Fig. 6.
Fig. 7.
INVENTOR.
LYMAN C. STONE
BY
John J. Lynch
ATTORNEY.

Patented Nov. 12, 1935

2,020,384

UNITED STATES PATENT OFFICE 2,020,384

CAMERA CONSTRUCTION

Lyman C. Stone, New York, N. Y.

Application October 11, 1934, Serial No. 747,826

8 Claims. (Cl. 95—31)

This invention relates to cameras and in particular to the construction of a camera at exceptionally small cost so that the buyer will benefit by the method employed in the manufacture thereof.

A particular object of my invention is to produce a camera, the body or casing of which is molded so that the only parts necessary to add to the body will be the film take-up device, the lens and shutter and covers, means being molded into the body for holding the film spool in use and for holding an extra film spool in reserve.

A further object of my invention is to provide in the construction referred to, a camera body that permits the few parts necessary to be added thereto, to be quickly secured in position, thus further cutting the cost of production. Another object is to produce a small compact camera which can be carried in the pocket or handbag and which needs no manipulation to place it in readiness for use in taking pictures.

Changes and variations in the construction shown and described, may be made without departing from the principles of the invention or sacrificing its chief advantages; and for the purposes of illustration, a preferred embodiment of my invention is shown in the accompanying drawing, in which:

Figure 1 is a view in front elevation of a camera constructed in accordance with my invention, a part of the shutter cover being broken away to illustrate the parts.

Figure 2 is a view in side elevation with the side cover removed to show the construction of the interior of the camera body.

Figure 3 is a section taken on the line 3—3 of Figure 2 and illustrates the arrangement of the parts.

Figure 4 is a section taken on the line 4—4 of Figure 1 showing the construction of the lens and shutter housing and arrangement of the parts therein.

Figure 5 is a plan view of one type of shutter that I may employ in my camera, and Figure 6 is a view taken at 6—6 on Figure 1 and shows the take-up device used in winding the film from one spool to another.

Figure 7 is a view in perspective of a modified form of sighting device.

Referring to the drawing in detail, 5 indicates the camera body which I mold in hard rubber, bakelite, or any other suitable substance to provide essentially the entire body construction consisting of the integrally formed front and rear walls 6 and 7 respectively, the end walls 8 and 9 which may be of any shape desired, a side wall 10, and the upper and lower inner walls 11 and 12 respectively. The edge of the front, rear and end walls is flanged as at 13 to receive a cover 14 which is snapped thereon and is frictionally held in place to form a light-proof closure for the one open side of the camera. This cover is readily removed for insertion or removal of the film spools 15, upon which the film is wound in the well known manner, said film being indicated by the numeral 16. The end disc 17 of each spool 15 is provided with the spaced pins 18, the purpose of which will be hereinafter explained.

Formed integrally with the side wall 10 are the film spool pocket portions 19, 20 and 21, a part of each portion also forming a continuation of the upper and lower inner walls 11 and 12 which extend laterally of the body 5, are formed integrally with the side wall 10, and have their edges at the open side of the body flush with the underside of the cover 14 when the same is in position on the body. These inner walls are also formed integrally with the front wall and terminate short of the rear wall 7 to provide a film passage space 22 between the end of each inner wall and the rear wall. The pocket portions 19, 20 and 21, form the spool pockets 23, 24 and 25 respectively, the pocket 24 being employed as a storage pocket for an extra spool of film. In the bottom of the pocket 23 I provide a film take-up device or winder which consists of a bar 26 from which extends a rivet or stud 27 through the side wall 10 and through a boss 28 formed integrally with, and on the exterior of, the side wall 10, and through a finger cap 29. This cap 29 may be knurled exteriorly and is secured to the rivet in any suitable manner. The boss 28 is notched as at 30 to receive a ball 31 which wedges itself between the depending flange of the cap 29 and the boss to prevent revolving movement of the cap in a direction to unwind the film while permitting take-up of the film. The rear wall is provided with the usual sight through which may be seen the number on the film that denotes the exposure made. The bar 26 to which the rivet 27 is secured engages the pins 18 on the end disc 17 of the spool 15 to revolve the spool.

In the top end wall of the body I provide a sight device in the nature of a wire frame 32 having legs 33 which pass through openings 34 in said end wall and are crimped as at 35 to snap into position and be yieldably held to support the finder in its open position, the same having an eye 36 formed therein through which the object to be photographed may be properly sighted. Any other form of finder may be employed and any type of shutter may be used aside from the one shown in the drawing.

The shutter is held in a shutter housing 37 which consists of a flange 38 cast or molded integrally with the front wall 6 of the body, said flange being concentric with a lens opening 39 in said front wall and having spaces therein as at 40, 41 and 42, the latter for the shutter arm and the openings 40 and 41 for the lips of the shutter plate to prevent the shutter from revolving. The shutter comprises a plate 44 having the lips 45 which engage the openings 40 and 41 and a central light opening 46. To the plate 44 is pivoted as at 47 the latch 48 whose end is connected by a spring 49 to a latch plate 50, which in turn is pivoted to the plate 44 as at 51. Both the latch plate and the latch have an elongated opening so that when the latch plate operates the light can pass through the hole 46 and through the lens 52, which rests in the flanged opening 39 of the front wall. The shutter is operated by finger engagement with the shutter arm 53, which projects through the space 42 in flange 38 and also through a slot 54 in shutter housing cover 55 which is provided with a central light opening and fits frictionally over the flange 38.

If desired the camera body may be of any color desired or may be covered with any material such as leather or the like to enhance its appearance.

It is evident, therefore, that I have provided a camera that is small and compact, has few parts, is sturdy in construction, is light proof, is inexpensive to manufacture and can be sold at a low cost to the buyer.

In Figure 7, a plate 54 is suitably secured to the casing and to the ears 55 of said plate, the sighting frames 56 are hinged so that they can be folded flat when not in use.

My invention is not to be restricted to the precise details of construction shown, since various changes and alterations may be made therein without departing from the scope of my invention as defined by the claims.

What I claim is:

1. A camera comprising a molded body including front and rear walls, inner spaced upper and lower walls therein, and film spool pockets formed integrally with said spaced walls and said spaced walls extending from said front to rear wall.

2. A camera comprising a molded body including outer end walls and inner relatively spaced upper and lower walls, said upper and lower walls being spaced from said end walls, and film spool pockets for film in use formed integrally with said inner walls and a film spool pocket for film not in use formed integrally with one of said walls.

3. A camera comprising a body including front and rear walls, upper and lower end walls, a side wall and upper and lower inner walls extending from the front to the rear wall and spaced from said end walls, a film spool pocket in each of said inner walls, all of said walls and pockets being molded in an integral structure, and a removable cover constituting the other side wall of the body.

4. A camera comprising a body including front and rear walls, upper and lower end walls, inner walls having hollow portions constituting film spool pockets, said inner walls being spaced from said end walls, a shutter housing on the front wall constituting a flange having openings therein for passage of parts of a shutter mechanism positioned in said housing, and all of the said walls and portions being molded in a unitary structure, and a removable cover for the housing and the body.

5. A camera comprising a molded body including front rear and end walls, a side wall, inner walls spaced apart and from said end walls and film spool pocket forming portions in said inner walls, all of said walls and portions being formed integrally, said front wall having a lens opening therein and a shutter housing formed integrally therewith and constituting a flange having edge openings therein for the reception of extended parts of a shutter mechanism positioned in said housing, a removable cover for the housing, a removable cover for the body constituting a side wall therefor, and means associated with one of the spool pockets for winding a film spool positioned therein.

6. In a camera of the character described, an integrally molded body comprising end walls and spaced inner walls, film spool pocket portions for a film in use, said pocket portions being formed in said inner walls, a film spool pocket portion for film not in use, and a sighting device movable through an end wall of the camera and into the space between one of said end walls and one of said inner walls whereby said device is partly concealed within the camera when not in use.

7. A camera as set forth in claim 1 including a shutter housing molded integrally with the body of the camera a shutter mechanism in said housing, and said housing having openings therein for the reception of extended parts of the shutter mechanism whereby abnormal movement of the mechanism is prevented.

8. A camera as set forth in claim 5 including a plate secured to the body, and a plurality of sighting frames hinged to said plate and foldable against said plate when not in use.

LYMAN C. STONE.